Aug. 23, 1932.  R. C. BEST  1,873,266
ATTACHMENT FOR LAWN MOWERS
Filed June 20, 1929  2 Sheets-Sheet 1
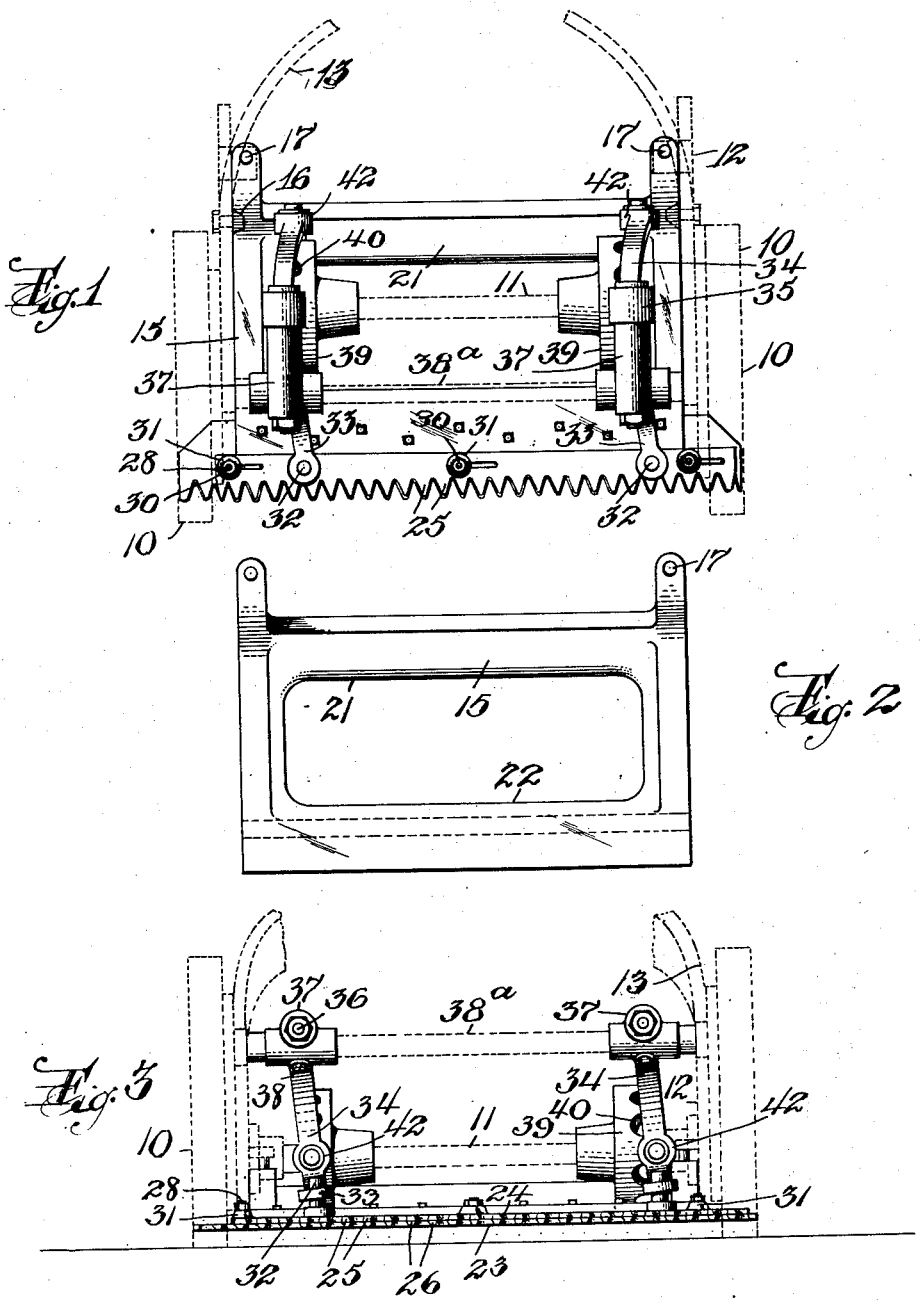
INVENTOR
Richard C. Best
BY
Wm H Canfield
ATTORNEY Aug. 23, 1932.  R. C. BEST  1,873,266
ATTACHMENT FOR LAWN MOWERS
Filed June 20, 1929   2 Sheets-Sheet 2
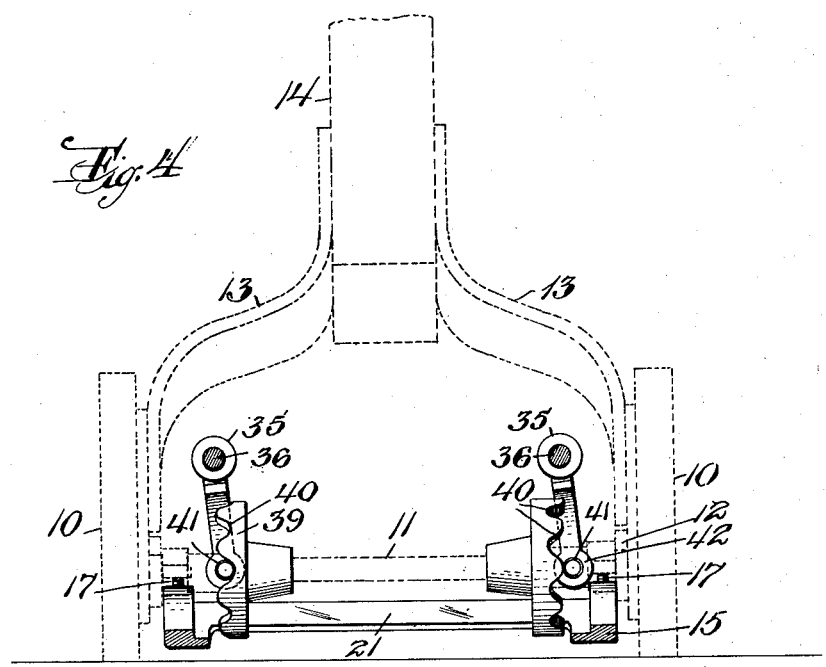
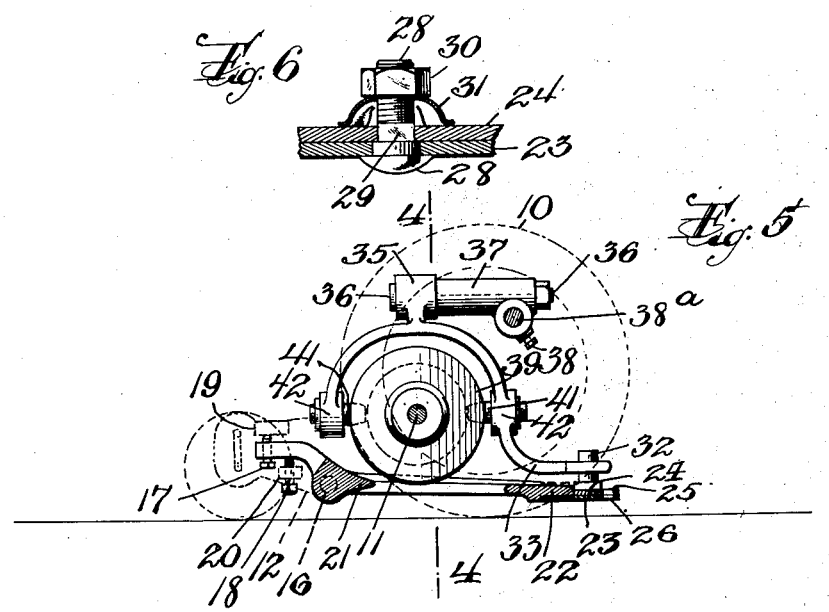
INVENTOR
Richard C. Best
BY
Wm H. Caufield
ATTORNEY Patented Aug. 23, 1932

1,873,266

UNITED STATES PATENT OFFICE

RICHARD C. BEST, OF NEWARK, NEW JERSEY, ASSIGNOR OF ONE-HALF TO HUGH SWEENEY, OF NEWARK, NEW JERSEY

ATTACHMENT FOR LAWN MOWERS

Application filed June 20, 1929. Serial No. 372,299.

The object of this invention is to provide an attachment for a lawn mower which will be utilized for cutting high grass.

The lawn mower which has the usual rotary cutter becomes useless in high grass and in order to cut grass of this kind I attach my improvement to the lawn mower. The rotary cutter and the fixed blade are removed and the new and improved parts are placed on the mower. The operating shaft and the frame are utilized in supporting and operating the attachment. When the high grass has been cut the attachment can be removed and the ordinary rotatable cutter and the fixed blade can be again installed.

The invention is illustrated in the accompanying drawings in which Figure 1 is a top view of my improved attachment with the frame and rollers of the lawn mower shown in dotted outline. Figure 2 is a top view of a plate that supports the cutters. Figure 3 is a front view of the construction shown in Figure 1. Figure 4 is a vertical section on line 4—4 in Figure 5. Figure 5 is a central vertical section of the construction shown in the previous figures. Figure 6 is a section of the washers that hold the cutter blades in contact.

In the construction illustrated, the usual rollers or wheels 10 are employed to rotate the shaft 11. This is the usual construction of lawn mower as is the mower frame 12 which has the arms 13 to which is attached the handle 14. The usual fixed blade of the ordinary lawn mower is removed and is replaced by a frame 15 which is secured at the back on the pivots or studs 16 and is adjusted vertically by screws 17 and 18 which bear on the respective lugs 19 and 20 on the mower frame 12. The frame 15 has the opening 21 to allow for the operating mechanism hereinafter described. The front bar 22 of the frame 15 is recessed to receive the fixed blade 23 which is screwed to the underside of the bar.

The sliding blade 24 is supported on the fixed blade and has teeth 25 which are similar to teeth 26 on the fixed blade and serve to cut the grass. The blade 24 is slotted and these slots receive the bolts or pins 28 and the blades are thus kept aligned. The bolts 28 have the square portions 29, as shown in Figure 6 and on the top are the nuts 30 which rest on the spring washers or cups 31 which rest in turn on the sliding blade 24. This provides for the proper tension on the blades to keep them in proper sliding contact.

The blade 24 is moved by means of a connection which is shown as pins or studs 32 which receive the perforated ends 33 of the yokes 34. The yokes are suspended by eyes 35 from the rods or shafts 36 on the brackets 37. The brackets are secured to the cross rod 38ª and are extended to the rear far enough to bring the centre of the yoke 34 over the shaft 11. The brackets 37 are secured in place by suitable means such as the set screws 38.

The yokes 34 are semi-circular and bridge the cams 39 which are secured on the shaft 11. The cams are provided with the cam surfaces 40 against which are placed the rollers 41. The rollers are secured in bearings 42 on the yokes. The cams are adjusted in order to alternate the thrust on the two yokes and in this way the knife 24 is slid from side to side on the fixed knife 23 as the extensions 33 of the yokes are in engagement with the pins or studs 32.

It will be evident that various changes can be made in the device without departing from the scope of the invention.

I claim:—

1. An attachment for lawn mowers comprising a frame, a fixed blade on the end of the frame, a blade slidable on the fixed blade, a pair of yokes each with an extension thereon which extension engages the slidable blade, a roller on each yoke, a pair of cams, each cam within a yoke and engaging a roller, brackets from which the yokes are pivotally suspended at their top ends, and means on the brackets for securing them to the cross rod of a lawn mower.

2. In combination with a lawn mower frame, an attachment comprising a frame having bearings near one end, an adjusting means on the mower frame at said end for adjusting the attachment frame relative to the mower frame, a fixed blade secured to the other end of the frame, a movable blade on the fixed blade, studs on the movable blade, a pair of yokes of semi-circular shape, each with an extension in engagement with a stud, circular cams within the yokes, rollers on the yokes and engaging the cams, brackets from one end of each of which a yoke is pivotally suspended at its top end, and means on the other end of each bracket for securing it to the cross rod of the lawn mower.

In testimony whereof I affix my signature.

RICHARD C. BEST.